United States Patent [19]

Kelly et al.

[11] 4,014,180
[45] Mar. 29, 1977

[54] METHOD FOR MAKING A REMOTE CONTROLLED SUB-SEA PIPE CONNECTION

[75] Inventors: James A. Kelly; Thomas J. Ames, both of Houston, Tex.; Glen E. Lochte, Asker, Norway; Burlie R. Bowen, Houston, Tex.

[73] Assignee: Hydro Tech International, Inc., Houston, Tex.

[22] Filed: Nov. 21, 1975

[21] Appl. No.: 633,965

[52] U.S. Cl. .............. 61/110; 29/401 E; 29/237; 214/1 P; 228/44.5; 285/24; 166/.6
[51] Int. Cl.² .............. B23K 37/04; F16L 23/00
[58] Field of Search .............. 61/72.3, 72.1, 72.4, 61/46.5, 69 R; 285/24; 37/54; 228/44.5; 29/200 P, 237; 214/1 P; 220/5

[56] References Cited
UNITED STATES PATENTS

| | | | |
|---|---|---|---|
| 3,293,867 | 12/1966 | Dean | 61/465 X |
| 3,578,233 | 5/1971 | Meister et al. | 228/49 |
| 3,635,183 | 1/1972 | Keatinge | 61/69 R X |
| 3,785,160 | 1/1974 | Banjavich et al. | 61/69 R |
| 3,822,558 | 7/1974 | Blankenship | 61/724 |
| 3,835,655 | 9/1974 | Oliver | 61/72.3 |

Primary Examiner—Jacob Shapiro

[57] ABSTRACT

Method for making a remote controlled sub sea pipe connection between two pipe ends which may be relatively misaligned on a sea bottom comprising, providing a pair of mating coupling halves having misalignment capability for connecting together the pipe ends; lowering a remote controlled vehicle towards the pipe ends; installing a pipe coupling half onto each pipe end, and connecting the pipe coupling halves together and to the respective pipe ends by remotely operating the vehicle from the sea surface to thereby effect the pipe connection.

9 Claims, 17 Drawing Figures

METHOD FOR MAKING A REMOTE CONTROLLED SUB-SEA PIPE CONNECTION

FIELD OF THE INVENTION

This invention relates broadly to method for making a sub-sea pipe connection and, in particular to method for making a sub-sea pipe connection which is remotely controlled from the sea surface.

DESCRIPTION OF THE PRIOR ART

It is known to make a remote controlled sub-sea pipe connection by lowering the end of a pipeline with a joining manipulator attached thereto to the sea bottom at a point adjacent to a prelaid pipe end. The joining manipulator then lines up the pipe ends, cuts the pipe to match the pipe ends and joins the ends in precise longitudinal co-axial relation by means of either thermic welding, a split sleeve type mechanical joint, a tongue and groove coupling or an explosive mechanical joint.

It is contemplated that such a pipe connection would be very difficult to achieve however, particularly with regard to the joining manipulator having to align the pipe ends in precise alignment as aforesaid. That is to say, it is believed that the joining manipulator would encounter difficulty in bending the pipe ends into precise longitudinal co-axial alignment with each other to enable the connection to be made. Such precise alignment is required because of the limitations imposed on the connection by the particular joining means disclosed for connecting the pipe ends. Otherwise stated, the joining means disclosed above do not have the capability to allow misalignment between the pipe ends hence, the reason for the pipe ends having to be bent into precise alignment.

SUMMARY OF THE INVENTION

It is therefore a broad object of the present invention to provide method for making a remote controlled sub-sea pipe connection.

Another object of the present invention is to provide method for making a remote controlled sub-sea pipe connection which does not require the pipe ends to be bent into longitudinal co-axial alignment.

To achieve the foregoing and other obvious objects of the invention, both stated and unstated hereinafter, the invention visualizes a method for making a remote controlled connection between two pipe ends capable of being relatively misaligned on a sea bottom comprising the steps of: providing a pair of mateable coupling halves having misalignment capability for connecting together the pipe ends which may be relatively misaligned as aforesaid; lowering a remote controlled vehicle towards the pipe ends; installing a pipe coupling half onto each pipe end, and connecting the pipe coupling halves together and to the respective pipe ends by remotely operating the vehicle from the sea surface to thereby effect the pipe connection.

Other objects of the invention more or less broad than the foregoing will become apparent from the hereinafter following description of the elements, parts and principles of the invention given herein solely by way of example and with reference to the accompanying drawings wherein like reference numerals refer to like parts of the invention.

DESCRIPTION OF THE PREFERRED EMBODIMENT

In the case of having to repair a pipeline P (FIG. 1) with a leak therein, the approximate location of the leak would first be determined using conventional pigging techniques. Thereafter, pipeline P would be located in the area of the leak by a ship towing a fish conventionally equipped with a magnetometer, a side-scanning sonar, a sub bottom profiler and acoustic homing beacons. Other acoustic beacons would then be dropped to the sea bottom to facilitate a good bottom survey and to mark the site for the repair system.

Figure 11:
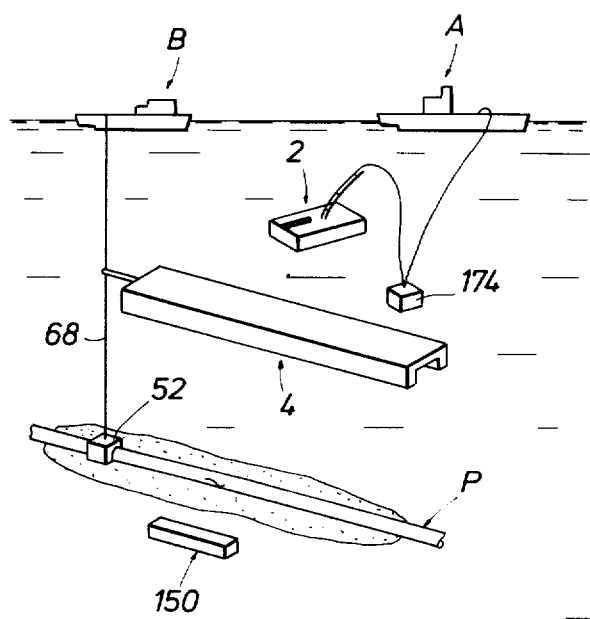

The invention visualizes the repair system to include two support vessels A and B as shown in FIG. 11, vessel A serving to provide support for a remote controlled work vehicle 2 with vessel B serving to provide support for a remote controlled transport vehicle 4; work vehicle 2 and transport vehicle 4 being described hereinafter in greater detail.

Figure 1:
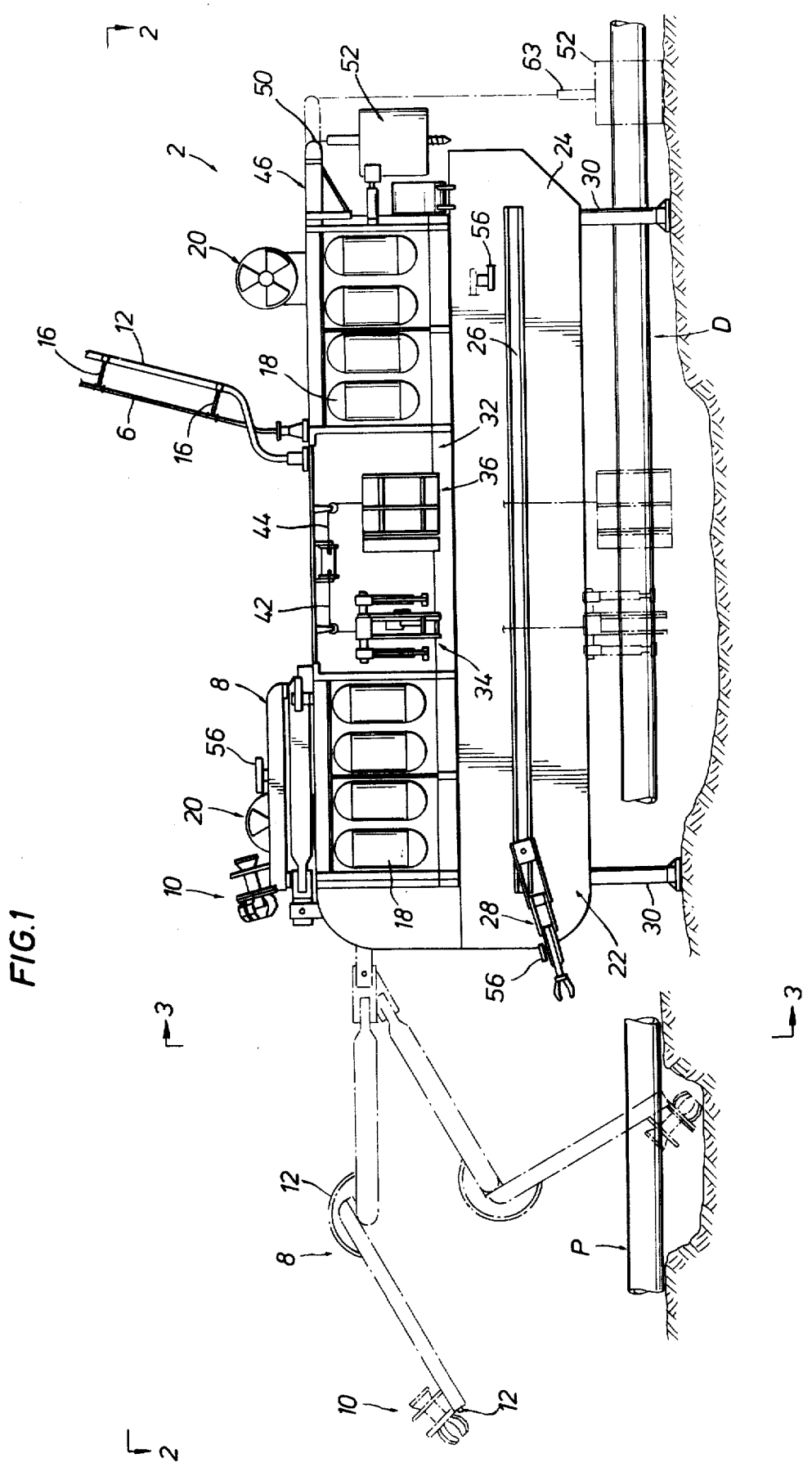
FIG. 1 is a longitudinal cross-sectional view of the work vehicle according to the present invention.
Figure 2:
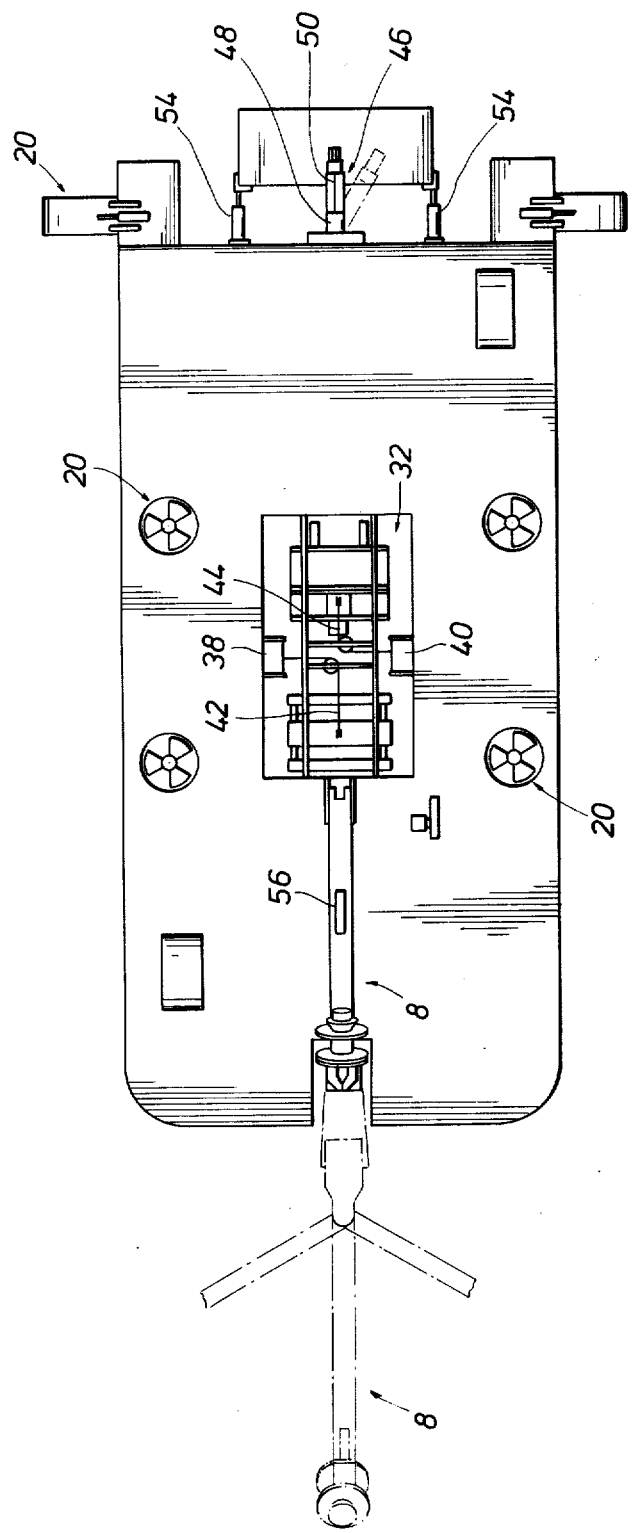
FIG. 2 is a top plan view of the work vehicle taken along line 2—2 of FIG. 1.
Figure 3:
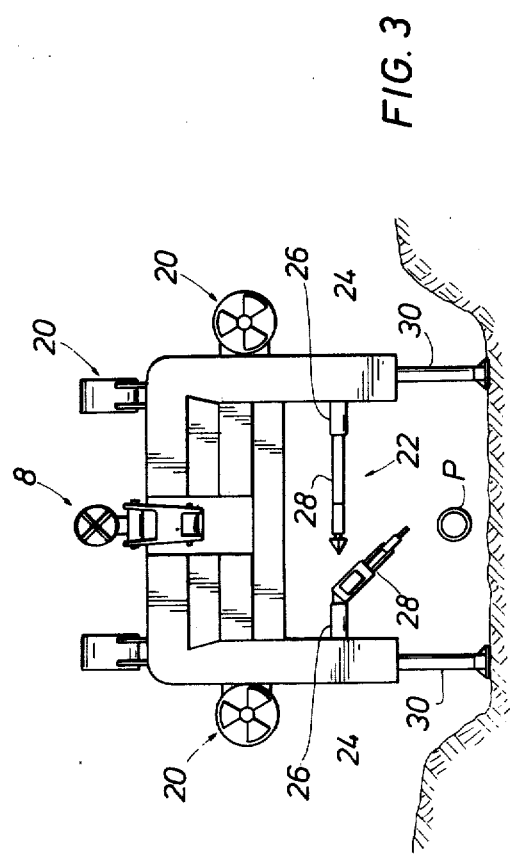
FIG. 3 is a front elevational view of the work vehicle taken along line 3—3 of FIG. 1.
Figure 9:
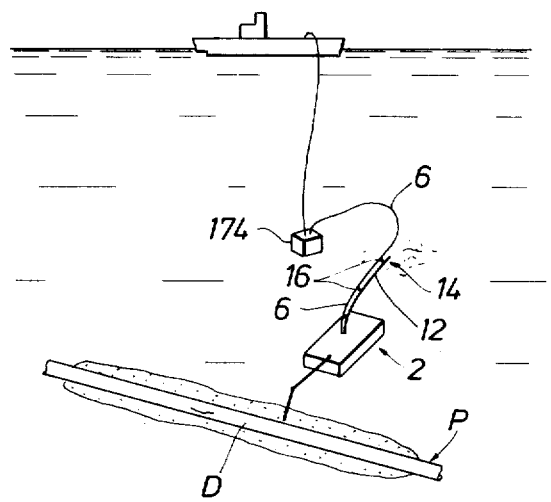
FIGS. 9–17 are schematic views illustrating various stages in the repair of a sub-sea pipeline.

Work vehicle 2 is fully automated with hydraulic and electrical power systems (not shown) and remotely controlled from support vessel A to find pipeline P at the site marked by the acoustic beacons on sea bottom and as shown in FIG. 1 includes an umbilical cable 6 which extends to vessel A, umbilical cable 6 providing the necessary power and control signals from vessel A to work vehicle 2. In addition, work vehicle 2 includes at one end thereof a conventional hydraulically powered articulated dredge arm 8 selectively movable between various positions as shown for example by the dotted and solid lines appearing in FIGS. 1 and 2; dredge arm 8 including a conventional hydraulically powered rotor head cutter 10. An exhaust hose 12 extends from rotor head cutter 10 to a dredge pump (not shown) within vehicle 2 and onward to a terminal point 14 spaced away from vehicle 2 as shown in FIG. 9. Preferably, hose 12 is attached to umbilical cable 6 at spaced intervals as at 16. Thus, upon selective actuation of rotor head cutter 10 and the dredge pump, spoils can be removed from head cutter 10 via exhaust hose 12 to be deposited on the sea bottom at a location remote from vehicle 2 as shown in FIG. 9. Work vehicle 2 also includes ballast tanks 18 and thrusters 20 for maneuvering purposes. Extending beneath the length of vehicle 2 is an open ended channel-shaped passageway 22 defined between opposite vehicle sides 24—24. Supported along each vehicle side 24 within passageway 22 is an elongated track 26 on which is movably mounted a conventional hydraulically powered universal manipulator 28; each manipulator 28 serving to perform dexterous functions regarding the installation of tools and so forth. Moreover, jack legs 30 extend from the underside of vehicle sides 24; and serve to selectively level and/or support vehicle 2 on the sea bottom above the pipeline. Disposed within vehicle 2 in communication with passageway 22 is a well 32 within which is housed a pipe cutter 34 of the type disclosed in U.S. Pat. No. 3,807,047, for example and a concrete removal device 36 yet to be described for use in the event that the pipeline is coated with concrete. In order to selectively lower and raise these tools towards and away from passageway 22 and pipeline P winches 38 and 40 having cables 42 and 44, respectively are provided. At the opposite end of work vehicle 2 is a crane 46 having a winch 48 and cable 50 suitably connected to a pipe anchor 52 to be described hereinafter in greater detail; crane 46 being extendible and retractable as well as laterally movable as best shown in FIGS. 1 and 2 to permit pipe anchor 52 to be maneuvered into position over pipeline P. For transportation purposes—i.e. when work vehicle 2 is moved between support vessel A and the sea bottom, a pair of spaced arms 54—54 extend from vehicle 2 to engage pipe anchor 52 to prevent lateral swaying thereof. Further, television cameras 56 are mounted at various locations on the work vehicle 2 to enable an operator on support vessel A to visually inspect underwater operations; television cameras 56 being selectively movable between the solid and dotted line positions shown in FIG. 1.

Figure 5:
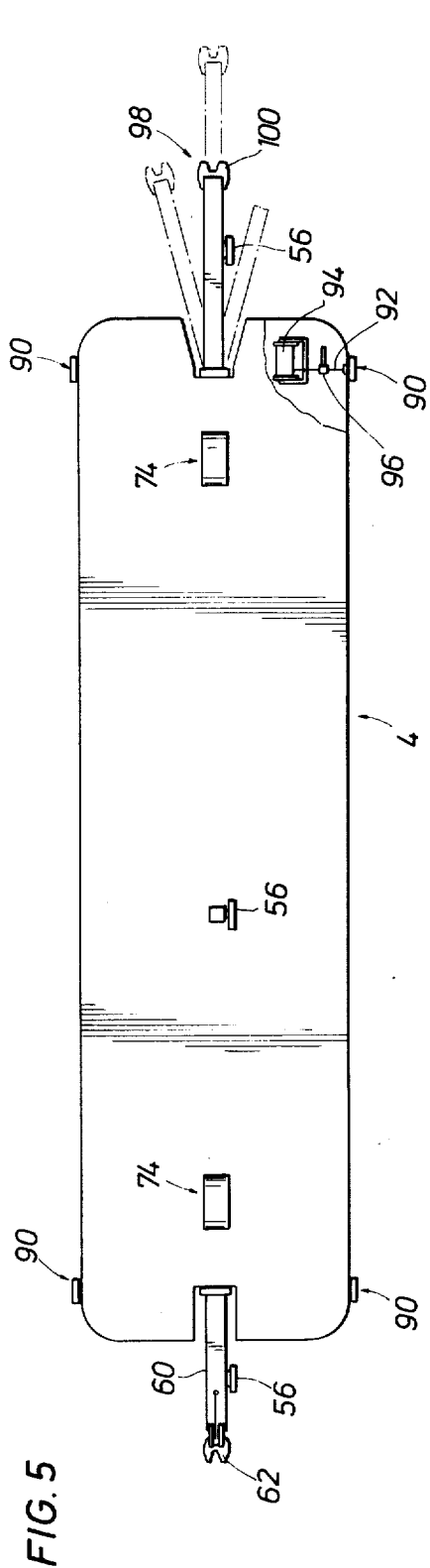
FIG. 5 is a top plan view of the transport vehicle taken along lines 5—5 of FIG. 4.
Figure 4:
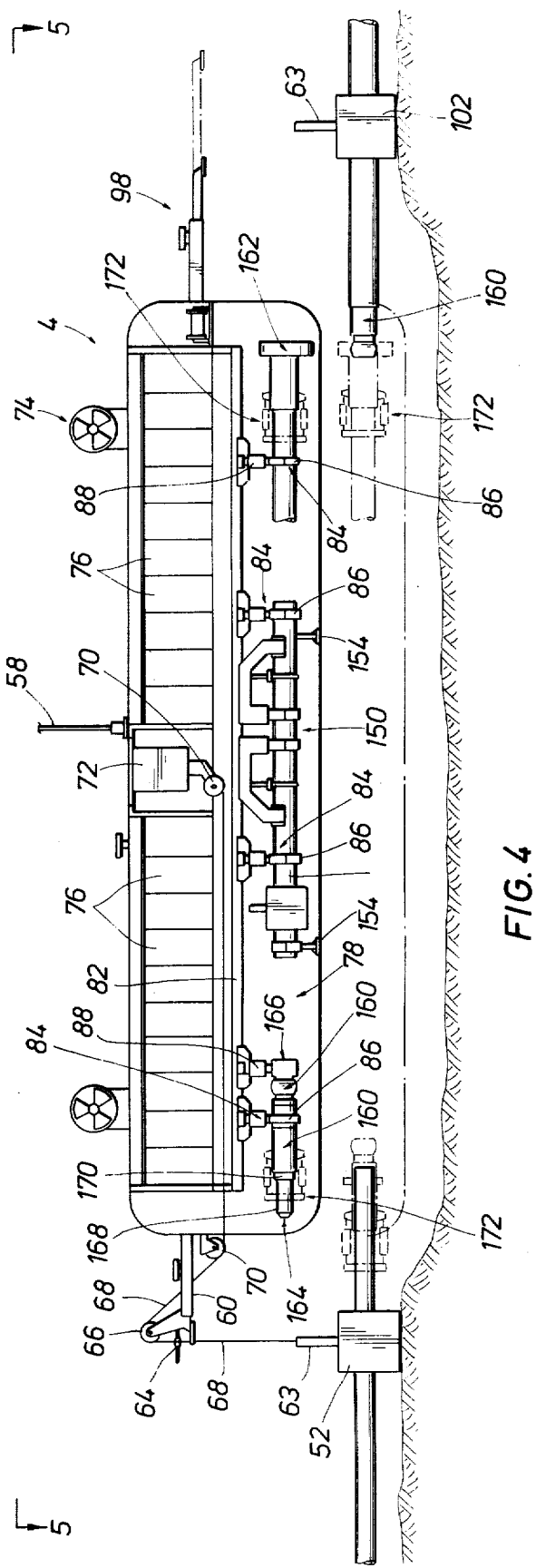
FIG. 4 is a longitudinal cross-sectional view of the transport vehicle according to the present invention.

Turning now to transport vehicle 4, it is also fully automated with hydraulic and electrical power systems (not shown) and remotely controlled from support vessel B and as shown in FIG. 4 includes an umbilical cable 58 which extends to vessel B, umbilical cable 58 providing the necessary power and control signals from vessel B to transport vehicle 4. In addition, vehicle 4 includes an alignment boom 60 extending axially from one end thereof: alignment boom 60 having a fork 62 engageable with a guide post 63 on pipe anchor 52 and a conventional electrically actuable explosive cable cutter 64 and a pulley 66 over which is trained a cable 68 extending upward from pipe anchor 52 in a manner to be described; cable 68 being also trained over pulleys 70 to a haul down winch 72, located within vehicle 4. Thus, by selectively operating winch 72, cable 68 can be wound thereon to effect downward movement of vehicle 4 towards pipeline P to be repaired. Moreover, vehicle 4 includes thrusters 74 and ballast tanks 76 for maneuvering purposes. Extending beneath the length of vehicle 4 is an open ended channel-shaped passageway 78 defined between opposite vehicle sides 80—80 similarly to that described for work vehicle 2. Supported along the longitudinal axis of vehicle 4 within passageway 78 is an elongated track 82 on which is mounted a plurality of movable support clamps 84. Each clamp 84 in turn includes hydraulically powered jaws 86 for selectively grasping or releasing various tools and an alignment mechanism 88 for selectively rotating, elevating or lowering jaws 86 to enable the latter to manipulate the object in its grasp. Further, vehicle 4 includes for stability purposes conventional anchors 90 on opposite sides thereof which can be selectively dropped to the sea bottom when vehicle 4 has descended in close proximity thereto; each anchor 90 being attached to a cable 92 which in turn is connected to a haul down winch 94. In addition, a conventional, electrically actuable explosive cable cutter 96 is provided for selectively severing each cable 92. Also, an extendible boom 98 is pivotally mounted on the longitudinal axis at the opposite end of transport vehicle 4 for lateral movement between the dotted and solid line positions in FIG. 5; boom 98 including a fork 100 at the end thereof which is engageable with a guide post 63 extending upwardly from a second pipe anchor 102.

Thus it will be understood that when transport vehicle 4 has been hauled down by winch 72 in close proximity to pipeline P thrusters 74 will be operated to maneuver vehicle 4 laterally into general longitudinal alignment with pipeline P. Thereafter, anchors 90 on opposite sides of vehicle 4 will be dropped to the sea bottom on opposite sides of pipeline P whereupon winches 94 together with winch 72 will be selectively operated to pull transport vehicle 4 downwardly so that pipeline P enters passageway 78 and guide post 63 on pipe anchor 52 enters fork 62 providing a pivot point about which vehicle 4 can maneuver laterally. In that event, extendible boom 98 will be maneuvered so that fork 100 becomes engaged with guide post 63 of pipe anchor 102 whereupon further lateral movement of boom 98 towards axial alignment with transport vehicle 4 will enable the latter to be axially aligned with pipeline P. Once transport vehicle 4 has achieved its function cable cutters 96 can be electrically actuated to explosively sever the associated cables 92 to thereby release vehicle 4 for ascending to the surface along cable 68. Of course, it is contemplated that television cameras 56 will also be mounted at various locations on transport vehicle 4 to enable an operator on support vessel B to visually inspect underwater operators similarly to those cameras 56 on work vehicle 2 as aforesaid.

Figure 7:
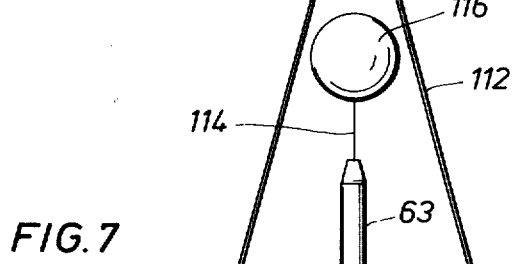
FIG. 7 is a front elevational view of a pipe anchor according to the present invention.

With more particular regard now to pipe anchor 52, FIG. 7 illustrates it to include an inverted U-shaped main body 104 having spaced legs 106—106 for accommodating pipeline P therebetween. Disposed within each leg 106 is a hydraulically powered auger-type shaft 108 which is selectively screwed into the sea bottom to firmly implant pipe anchor 52. In addition, each leg 106 includes a hydraulically powered jaw 110 movable between a retracted position to enable legs 106—106 to accommodate pipeline P as aforesaid and an extended position to grasp the underside of pipeline P to firmly secure pipeline P and anchor 52 together. Moreover, pipe anchor 52 includes a bridle 112 for suitable engagement with the end of cable 50. In addition, guide post 63 is mounted at the center of pipe anchor 52 and is hollow to communicate with a chamber (not shown) within main body 104. Disposed within the chamber, though not shown, is a hydraulically powered winch having a cable 114 wound thereon at one end with the other end of cable 114 extending through hollow guide post 63 and having a buoy 116 attached thereto. It is visualized that once pipe anchor 52 has been securely positioned about pipeline P, a manipulator 28 will trigger a switch (not shown) to release the cable 114 and buoy 116. Buoy 116 in turn will unwind cable 114 as it ascends towards the sea surface. Buoy 116 and cable 114 will then be retrieved at the surface and a heavy duty cable—i.e. haul down cable 68 having a conventional latching mechanism (not shown), will be attached thereto. In that event, the winch within the chamber will be selectively operated to rewind cable 114 to pull down cable 68 therewith. Once the end of haul down cable 68 enters hollow guide post 63 the latching mechanism will actuate automatically to lock cable 68 to guide post 63 and, hence, to pipe anchor 52. Thereafter, transport vehicle 4 will be lowered over the side of support vessel B to be hauled down along cable 68 by selectively operating haul down winch 72.

Pipe anchor 102, on the other hand, is similar in all respects to pipe anchor 52 with the exception that it does not have a buoy and a chamber with winching apparatus therein.

Accordingly, it will be understood that pipe anchors 52 and 102 will each be installed by first positioning work vehicle 2 to straddle pipeline P as shown for example in FIG. 1. Thereafter, pipe anchor 52 or 102 as the case may be will be lowered into position (using manipulators 28 for guiding purposes if necessary) about pipeline P where a manipulator 28 will then disconnect cable 50 from bridle 112. It is visualized that suitable power lines (not shown) will extend from vehicle 2 to pipe anchors 52 and 102 so that power may be supplied thereto to selectively hydraulically operate shafts 108 and jaws 110 and in the case of pipe anchor 52 the winch for cable 114.

Figure 8:
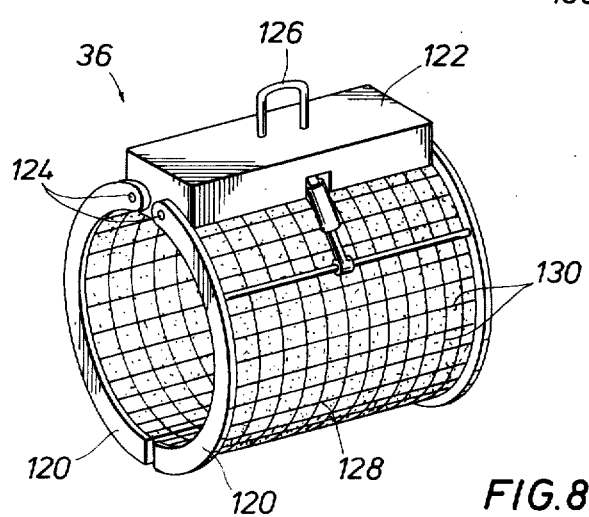
FIG. 8 is an isometric view of an explosive concrete removal tool according to the present invention.

Turning now to said concrete removal device 36 (FIG. 8), the invention visualizes a pair of hydraulically powered jaws 120—120 hingedly attached to a beam 122 as at 124; beam 122 including an eyelet 126 for suitable engagement with the end of cable 44 extending from winch 40. Each jaw 120 in turn is in the form of an arcuate framework to which is suitably attached a flexible member 128 containing an explosive charge 130, e.g. primacord. It is visualized that a conventional acoustic link can be utilized for detonating explosive charge 130 to thereby disintegrate the concrete coating. Of course, the size of the explosive charge will depend on certain variables such as the thickness of the concrete coating as well as the thickness of the pipe.

Accordingly, it will be understood that should pipeline P include concrete coating which must be removed then concrete removal device 36 would be employed by first positioning work vehicle 2 to straddle pipeline P as shown in FIG. 1 and operating winch 40 to lower device 36 onto pipeline P. Manipulator 28 would then disconnect cable 44 from eyelet 126 and work vehicle 2 would thereafter be relocated to a position remote from pipeline P where explosive charge 130 would be detonated acoustically, for example. Work vehicle 2 would then return to its pipeline straddling position to retrieve concrete removal device 36.

Figure 6:
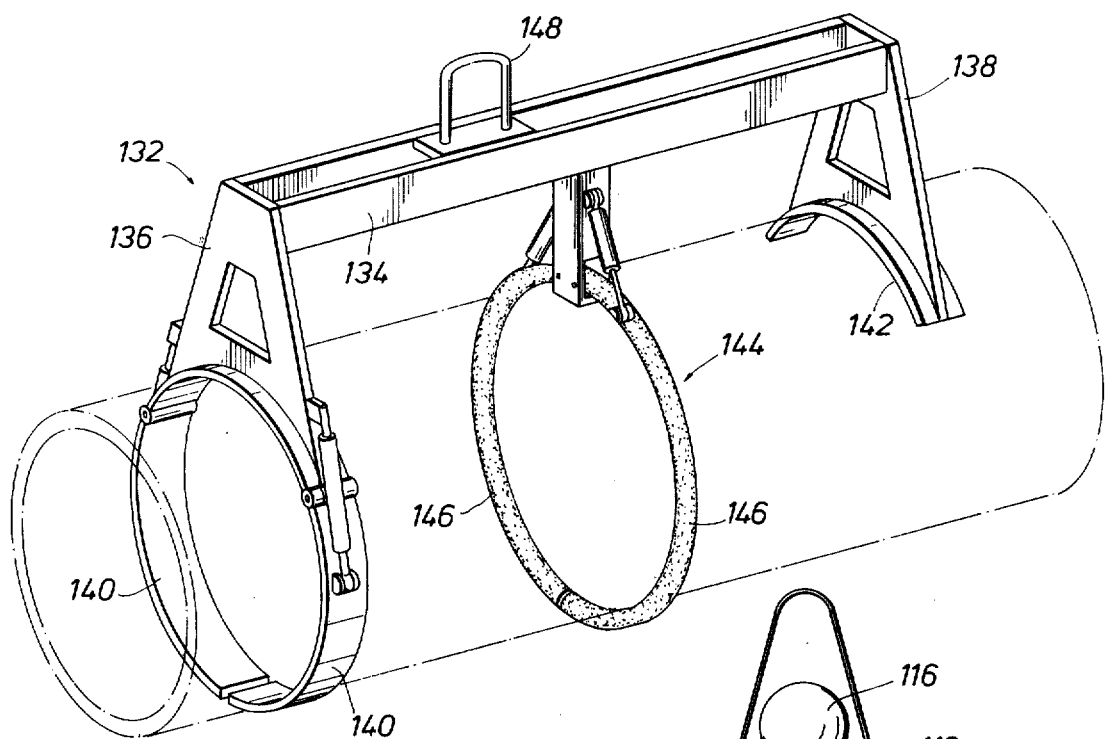
FIG. 6 is an isometric view of a strongback according to the present invention.

In order to remove a damaged section D (FIG. 1) of pipeline P the invention visualizes apparatus for severing the pipeline and, once severed, for temporarily holding the severed and damaged pipeline section D in position until it can be removed by transport vehicle 4 to a remote location. To this end, a pair of strongbacks 132—132 (FIG. 6) are provided, each of which includes a beam 134 from which depends a pair of spaced supports 136 and 138. Support 136 includes a pair of hydraulically powered arcuate jaws 140—140 for grasping the section of the pipeline to be severed. Support 138 on the other hand, includes an arcuate footing 142 which merely rests on the other section of pipeline P. Supported below beam 134 between supports 136 and 138 is an explosive charge 144 for severing pipeline P. Preferably, explosive charge 144 is in the form of a pair of hydraulically powered arcuate jaws 146—146 movable to grasp the pipeline as shown in FIG. 6. It is visualized that a conventional acoustic link can be utilized for detonating explosive charge 144. An eyelet 148 is provided on beam 134 to enable a manipulator 28 to grasp it for installation purposes.

Figure 12:
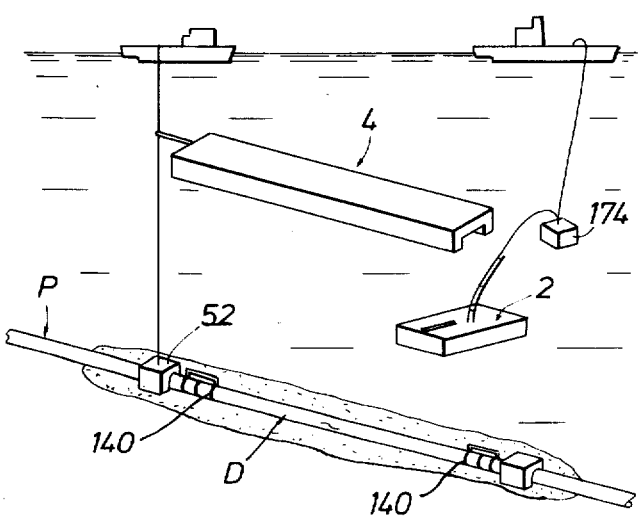

Thus it will be understood that strongbacks 132—132 will be installed by manipulators 28 onto pipeline P with suitable power lines (not shown) extending from vehicle 2 to jaws 140 and 146 to provide hydraulic power thereto to enable such installation. Once the strongbacks 132—132 are installed—i.e. with jaws 140—140 attached to pipeline section D to be removed as shown in FIG. 12 work vehicle 2 will be relocated to a remote position where explosive charges 144—144 will be detonated acoustically. After detonation, the damaged pipeline section D will of course remain in position to be easily grasped by clamps 84 of transport vehicle 4 for removal to a remote location.

It is visualized herein that strongbacks 132—132 and pipe anchor 102 will be transported from the sea surface to sea bottom by a rack 150 attached to transport vehicle as shown in FIG. 4. More particularly, rack 150 includes an elongated circular member 152 having a diameter which is equivalent to that of pipeline P; member 152 having a pair of props 154—154 for supporting it on sea bottom. For transportation purposes, circular member 152 will be grasped between jaws 86 of a pair of clamps 84.

Thus, it will be understood that strongbacks 132—132 and pipe anchor 102 will be attached piggy back style to circular member 152 by their jaws 140 and 110, respectively. Once transport vehicle 4 reaches sea bottom it will deposit rack 150 thereon whereupon work vehicle 2 will attach appropriate power lines (not shown) to strongbacks 132 and pipe anchor 102 to remove them for installation onto pipeline P.

Figure 17:
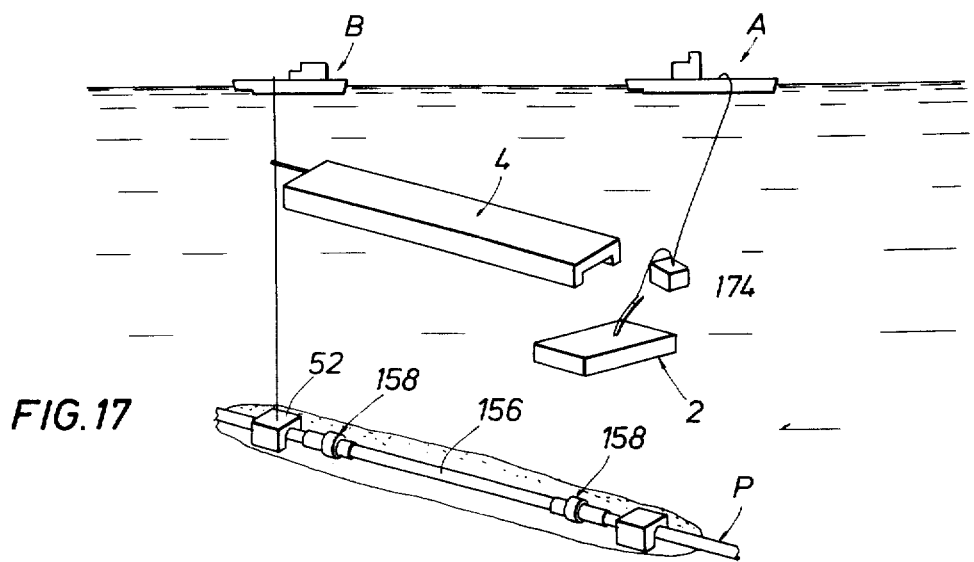

Turning now to the apparatus for replacing damaged pipeline section D, FIG. 17 illustrates a pipe spoolpiece 156 having couplings 158—158 on opposite ends thereof to connect it to respective ends of the severed pipeline P. More particularly, each coupling 158 is preferably of the ball and socket type wherein a ball coupling half 160 (FIG. 4) is hydraulically installed on one pipe end and a mating socket coupling half 162 (FIG. 4) is hydraulically installed on an adjacent pipe end as shown for example in U.S. Pat. No. 3,874,706. It is believed that in order to achieve an effective connection between the pipe ends, particularly when the connection is effected by remote control, the coupling should have some misalignment capability—i.e., be capable of coupling together pipe ends which are relatively misaligned. To effect installation of the coupling halves 160 onto the free ends of pipeline P, it is visualized that a circular stabbing device 164 (FIG. 4) will be supported in cantilevered fashion by a brace 166 movably mounted onto track 82 and including an alignment mechanism 88 as aforesaid for aligning stabbing device 164 with pipeline P; stabbing device 164, having a section 168 with a diameter slightly smaller than the internal diameter of pipeline P for insertion thereinto and a section 170 with a diameter equivalent to the external diameter of pipeline P. Movably mounted onto section 170 of stabbing device 164 is a coupling half 160 as shown in FIG. 4; coupling half 160 being held on stabbing device 164 by a clamp 84 for transporting purposes, i.e., when vehicle 4 transports coupling halves 160—160 from the sea surface to sea bottom. In addition, it is visualized that anchor clamp apparatus 172 as shown for example in U.S. Pat. No. 3,707,025 will be utilized to effect axial movement of coupling half 160 from stabbing device 164 onto the free end of pipeline P with appropriate hydraulic power lines (not shown) extending from clamp apparatus 172 to vehicle 4.

Thus it will be understood that once stabbing device 164 is co-axially aligned with the end of pipeline P brace 166 will be selectively moved along track 82 to effect insertion of stabbing section 168 into pipeline P in which event clamp 84 on coupling half 160 will be released and clamp apparatus 172 actuated to effect axial movement of coupling half 160 onto the end of pipeline P. Thereafter, coupling half 160 will be set hydraulically and stabbing device 164 removed from pipeline P. Vehicle 4 will then be operated to ascend to the surface where spool-piece 156 will be mounted within passageway 78 with the aid of clamps 84 as partially shown in FIG. 1. Telescopically mounted onto the opposite ends of spool-piece 156 are coupling halves 162; the latter also having clamp apparatus 172 attached thereto and to spool-piece 156. Once the spool-piece 156 has been lowered to where coupling halves 162 are in axial alignment with coupling halves 160, then the associated clamp apparatus 172 will be actuated to effect movement of coupling halves 162 towards mating engagement with coupling halves 160. In that event, coupling halves 162 will be hydraulically set onto coupling halves 160 and then onto spool-piece 156 to thereby effect the installation. Thereafter clamps 84 will be released from spool-piece 156 and vehicle 4 retrieved.

Figure 10:
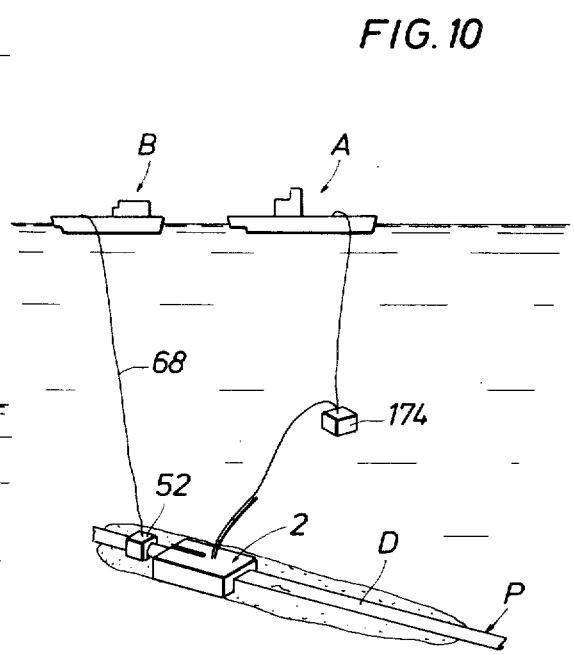
Figure 13:
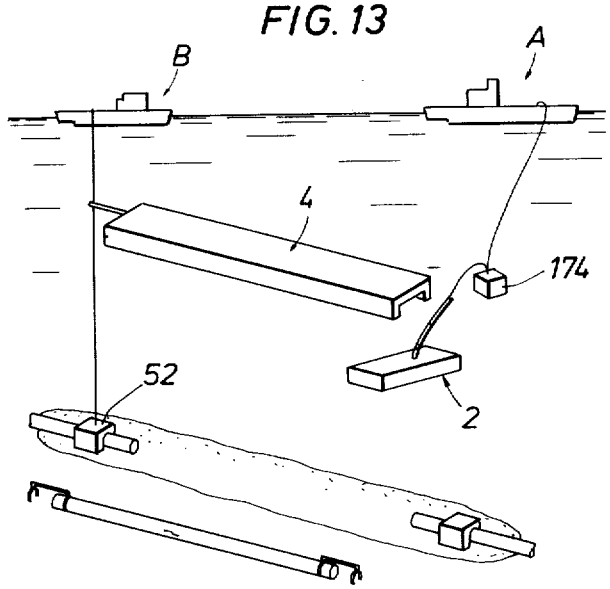
Figure 14:
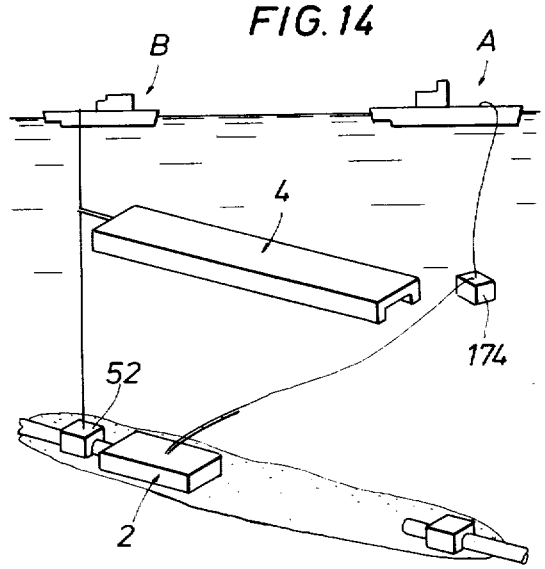
Figure 15:
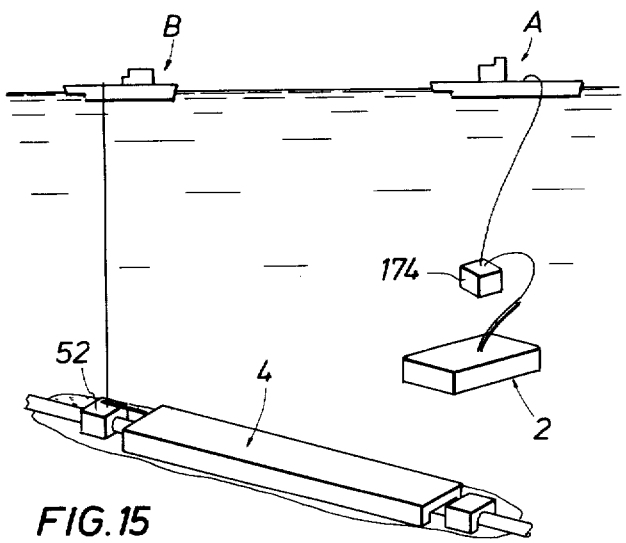
Figure 16:
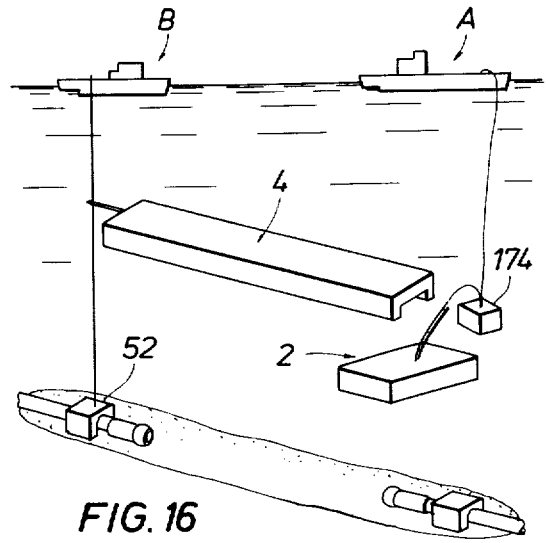

Having regard to the foregoing, the invention visualizes the repair operation to entail lowering work vehicle 2 to pipeline P utilizing acoustic homing beacons to arrive at an accurate placement of vehicle 2 at the work site in the leak zone. Preferably, an anchor 174 (FIG. 9) will be attached to umbilical 6 intermediate work vehicle 2 and support vessel A; anchor 174 being disposed on sea bottom remote from pipeline P and serving to isolate vehicle 2 from surface water effects. Once vehicle 2 has arrived at the site of damaged pipeline section D, it will excavate around pipeline section D to expose it as shown in FIG. 9. Thereafter, vehicle 2 will be maneuvered to straddle pipeline P as illustrated in FIG. 10 and install pipe anchor 52 and release cable 114 and buoy 116 as previously discussed. Buoy 116 and cable 114 will be retrieved at the sea surface where cable 68 will be attached to cable 114. Thereafter, cables 114 and 68 will be winched down to where one end of cable 68 is latched to guide post 63 with the other end of cable 68 being retained on vessel B as aforesaid. Subsequent thereto, transport vehicle 4 will descend from vessel B along cable 68 to deposit rack 150 on the sea bottom as shown in FIG. 11 whereupon vehicle 4 will be moved upward to some convenient location out of the way of the work site as shown in the same view. Vehicle 2 will then remove pipe anchor 102 from rack 150 and install it onto pipeline P on the other side of the leak from pipe anchor 52 a distance slightly greater than the axial length of vehicle 4 as measured between fork 62 and fork 100, the latter being in the retracted solid line position shown in FIG. 4. Such spacing will be measured by vehicle 2 using appropriate acoustic beacons (not shown) for example and will enable vehicle 4 to engage guide posts 63—63 to become aligned with pipeline P as aforesaid. With both pipe anchors 52 and 102 now installed, work vehicle 2 will proceed to install strongbacks 132—132 for severing pipeline P as shown in FIG. 12; it being recognized that strongbacks 132—132 are sufficiently spaced from pipe anchors 52 and 102 to provide severed pipeline ends of adequate length to accommodate coupling halves 160. Once strongbacks 132—132 are installed, vehicle 2 will be moved to a remote location where explosive charges 144—144 will be detonated acoustically, for example. Transport vehicle 4 will then be lowered to grasp the severed section D and move it to a remote location on sea bottom as shown in FIG. 13 after which vehicle 4 will be raised to a temporary station away from the work site as shown in the same view. Vehicle 2 will then be moved over each severed pipeline end (FIG. 14) to install pipe cutter 34 to cut a section off—i.e. that pipeline section which has been deformed as a result of the detonation of explosive charge 144. With the free ends of the pipeline now circular, pipe cutter 34 will be removed and vehicle 2 moved to a station remote from the work site. Thereafter, vehicle 4 will be moved into position (FIG. 15) to install coupling halves 160 as aforesaid whereupon vehicle 4 will be elevated towards vessel B (FIG. 16) to get spool-piece 156 and coupling halves 162 for installation between coupling halves 160 as shown in FIG. 17.

What we claim is:

1. A method of repairing a damaged section of a pipeline on a sea bottom remotely controlled from the sea surface comprising the steps of:
   supporting a pipe cutter on a remote controlled first vehicle;
   lowering said first vehicle toward said damaged pipeline section with said pipe cutter supported thereon;
   cutting said pipeline on opposite sides of said damaged pipe section by remotely operating said pipe cutter via said first vehicle;
   lowering a remote controlled second vehicle toward said damaged pipe section;
   removing said damaged pipe section with said second vehicle to thereby expose a pair of spaced pipe ends;
   lowering with said second vehicle a pipe spool-piece having opposed ends disposable adjacent to said spaced pipe ends;
   providing two pairs of mateable coupling halves, each pair being capable of connecting together respective ends of said pipe and said spool-piece;
   installing a coupling half of each pair onto respective ends of said pipe and said spool-piece, and
   connecting said coupling halves of each pair together and to the respective ends of said pipe and said spool-piece by remotely operating said second vehicle to thereby effect said pipe connection between said spaced pipe ends.

2. A method as defined in claim 1 and further including the step of:
   providing said second vehicle with remote controlled stabbing means for installing a coupling half of each pair onto a pipe end as aforesaid.

3. A method as defined in claim 2 and further including the step of:
   providing remote controlled moving means for moving said coupling halves of each pair into mating engagement for connecting said coupling halves together as aforesaid.

4. A method as defined in claim 1 and further including the step of:

excavating about said pipeline by remotely operating said first vehicle to expose said damaged section.

5. A method as defined in claim 1 and further including the step of:

anchoring said pipe ends by remotely operating said first vehicle, to thereby lower pipe anchors over each of said pipe ends.

6. A method as defined in claim 1 and further including the step of:

temporarily supporting said damaged pipe section in coaxial alignment with said pipe ends after said damaged pipe section has been severed from said pipeline.

7. A method for remotely connecting on a sea bottom a first pipe end to a second pipe end, said pipe ends being relatively misaligned, the combination of steps comprising:

excavating a trench beneath the junction of said first and second pipe ends, said trench generally running parallel to said pipes;

anchoring said first and second pipe ends to said sea bottom;

installing upon said first pipe end a first part of a two-part engageable pipe coupling tool;

installing upon said second pipe end the second part of said two-part engageable pipe coupling tool;

and engaging said first and second parts of said two-part engageable pipe coupling tool, thereby connecting said first and second pipe ends.

8. A method for remotely connecting on a sea bottom a pair of relatively misaligned spaced apart pipe ends, the combination of steps comprising:

excavating a trench beneath the junction of said pipe ends, said trench running generally parallel to said pipes;

anchoring each of said pipe ends to said sea bottom;

installing upon each of said pipe ends a first part of a two-part engageable pipe coupling tool;

placing a spool-piece between said pipe ends in substantial axial alignment therewith, said spool-piece having installed upon each end thereof the second part of said two-part engageable pipe coupling tool;

and engaging said two part engageable pipe coupling tools to effect the connection of said spool-piece to said first and second pipe ends, thereby connecting said first and second pipe ends.

9. A method for remotely repairing on a sea bottom a damaged section of pipe, the combination of steps comprising:

excavating a trench under said damaged section, said trench running parallel to said pipe and having ends such that said damaged section is locted therein;

anchoring said pipe to said sea bottom with a pair of pipe anchors, said pipe anchors being spaced so that said damaged section is located therebetween;

severing said pipe on either side of said damaged section and between said pipe anchors;

removing said severed damaged pipe section, thereby leaving a pair of pipe ends anchored by said pipe anchors;

installing upon each of said pipe ends a first part of a two-part engageable pipe coupling tool;

placing between said pipe ends in substantial axial alignment therewith a spool-piece, said spool-piece having installed upon each end thereof the second part of said pipe coupling tool;

and engaging said pipe coupling tools to effect the connection of said spool-piece to said pipe ends, thereby completing the repair of said pipe.

* * * * *